United States Patent
De La Cruz et al.

(10) Patent No.: US 7,246,256 B2
(45) Date of Patent: Jul. 17, 2007

(54) MANAGING FAILOVER OF J2EE COMPLIANT MIDDLEWARE IN A HIGH AVAILABILITY SYSTEM

(75) Inventors: Francisco De La Cruz, Austin, TX (US); Michael A. Paolini, Austin, TX (US); Douglas Scott Rothert, Austin, TX (US); Radhakrishnan Sethuraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/761,163

(22) Filed: Jan. 20, 2004

(65) Prior Publication Data

US 2005/0172161 A1 Aug. 4, 2005

(51) Int. Cl.
*G06F 11/00* (2006.01)
(52) U.S. Cl. .................................. 714/4; 714/5; 714/6
(58) Field of Classification Search ..................... 714/5, 714/6, 7, 11, 24
See application file for complete search history.

(56) References Cited

U.S. PATENT DOCUMENTS

| | | | |
|---|---|---|---|
| 6,920,580 B1* | 7/2005 | Cramer et al. ............... | 714/4 |
| 2002/0169738 A1 | 11/2002 | Giel et al. | |
| 2003/0018927 A1* | 1/2003 | Gadir et al. .................. | 714/4 |
| 2005/0005200 A1 | 1/2005 | Matena et al. | |
| 2005/0159927 A1 | 7/2005 | Cruz et al. | |

OTHER PUBLICATIONS

Ellenberg, Lars-Gunnar. "Data Redundancy by drbd" Nov. 15, 2003. Linux Magazine. pp. 1-2 http://www.linux-mag.com/content/1491/2058/1/1.*
"Linux" "J2EE" Microsoft Computer Dictionary (fifth edition). Copyright 2002. Microsoft Press.*

(Continued)

*Primary Examiner*—Robert Beausoliel
*Assistant Examiner*—Philip Guyton
(74) *Attorney, Agent, or Firm*—Herman Rodriguez; Amy J. Pattillo

(57) ABSTRACT

A method, system, and program for managing failover of J2EE compliant middleware in a high availability system are provided. A primary node and a secondary node each run the same J2EE compliant middleware stack comprising layers including a load balancer, a web server, a web application server, a message control server, a monitoring server, and a database control server. In the primary node, all layers are active. In the secondary node, part of the layers are active and part of the layers are in standby. A data replication partition shared between the primary node and the secondary node includes persistent resource data accessible to a selection of the layers of the primary node. A heartbeat controller monitors each node, including the middleware stack, and upon detection of a failure, controls transfer of the services provided by the primary node to the secondary node by transferring virtual IP addresses from the primary node to the secondary node, remounting the data replication partition for access by the secondary node, and activating the standby layers which require access to the data in the data replication partition.

31 Claims, 7 Drawing Sheets

OTHER PUBLICATIONS

Joedecke et al., Highly Available DB2 Universal Database using Tivoli System Automation for Linux, ftp.software.ibm.com/software/data/pubs/paper/halinux.pdf , Available as of Jan. 14, 2004, Copyright 2003.

Gucer et al., Using IBM Tivoli System Automation for Linux, www.redbooks.ibm.com/redpapers/pdfs/red3716.pdf, Available as of Jan. 14, 2004, Copyright 2003.

Naciterhan, Open Source LINUX High Availability for IBM DB2 Universal Database, ftp.software.ibm.com/software/data/pubs/papers/db2halinux.pdf, Available as of Jan. 14, 2004, Copyright 2003.

Rao, IBM DB2 Universal Database clustering—High availability with WebSphere Edge Server, http://www-106.ibm.com/developerworks/ibm/library/i-cluster/ , Available as of Jan. 14, 2004, Copyright 2002.

Patel, A Scalable Linux Solution for E-Business Using WebSphere Application Server and DB2 Universal Database, ftp.software.ibm.com/software/data/pubs/paper/cluster1300.pdf, Available as of Jan. 14, 2004, Copyright 2002.

Guy et al., High Availability for J2EE Platform-Based Applications, http://java.sun.com/developer/technicalArticles/J2EE/applications/, Available as of Jan. 14, 2004, Copyright 2002.

Linux, www.redbooks.ibm.com/redpaper/pdfs/redp0220.pdf, Available as of Jan. 14, 2004, Copyright 2002.

Marks, J2EE Connector Architecture Brings Business System to the Web, http://java.sun.com/features/2000/08/connect.html, Available as of Jan. 14, 2004, Copyright 2000.

* cited by examiner

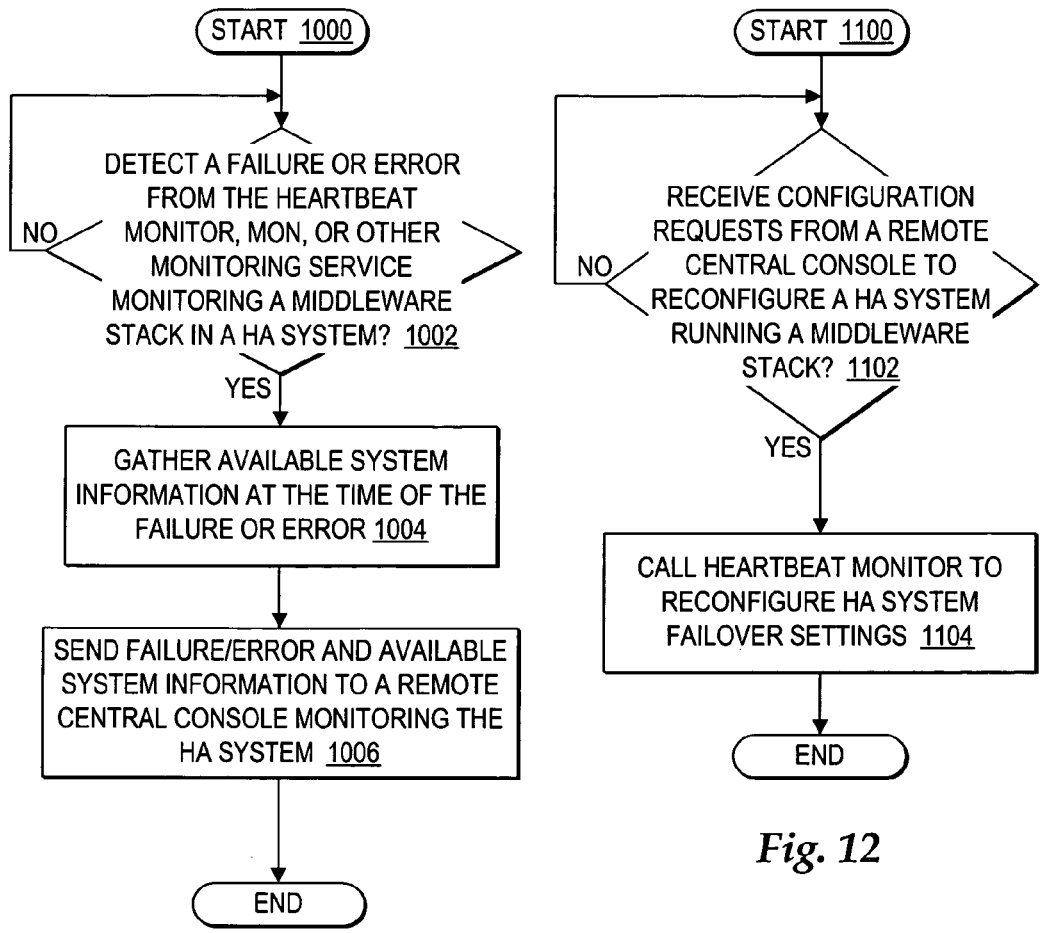
*Fig. 11*
*Fig. 12*
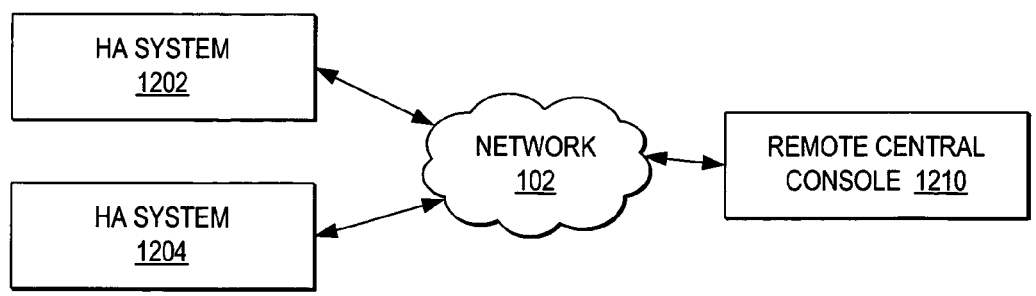
*Fig. 10*

MANAGING FAILOVER OF J2EE COMPLIANT MIDDLEWARE IN A HIGH AVAILABILITY SYSTEM

CROSS-REFERENCE TO RELATED APPLICATION

The present application is related to the following co-pending applications:

(1) U.S. patent application Ser. No. 10/761,162.

BACKGROUND OF THE INVENTION

1. Technical Field

The present invention relates in general to improved high availability cluster management in particular to improved high availability (HA) cluster management during failover. Still more particularly, the present invention relates to managing failover of J2EE compliant middleware in a HA system.

2. Description of the Related Art

For retailers, banks, and other on-line services where load and demand constantly fluctuate and where handling each customer request is of utmost importance, high availability (HA) systems have been developed to handle mission-critical operations. In general, an HA system is a system designed to eliminate or minimize the loss of service due to either planned or unplanned outages among components of a network system. The key method of providing an HA system is through redundant hardware and software components grouped into a cluster of servers.

Redundancy is important in an HA system because when a failure occurs in one node of the cluster, the system transfers the processes performed by one node to another. In a two-node HA cluster, for example, one node is typically designate as the primary node and the other node is typically designated as the backup node. In general, the primary node initially runs an application when a cluster is started. In addition, in general, a backup node is designated that will run the application if the primary node fails. The HA cluster system will typically implement a cluster manager process that periodically polls (or checks the heartbeat) of the primary node to determine if it is still active. If a "heartbeat" is not detected, then the cluster manager moves the software process to another server in a cluster.

In general, HA systems can be configured in an active-active state or an active-standby state. For a two-node HA cluster in an active-active state, both nodes are active. Thus, the standby node shares some state with the active primary node. For a two-node HA cluster in an active-standby state, the backup node is in standby mode. In standby mode, the components of the backup node must be initialized and brought online with the failover occurs.

An important characteristic of an HA system is the recovery time. In general, the recovery time in a HA system is the time taken for a backup node to take over an application from a failed primary node. Recovery time may be effected by whether an HA system is configured in active-active state or active-backup state.

Recovery time is particularly important in a sales based HA system because retailers may lose valuable business if a customer is not able to complete transactions quickly. A delay of even 30 seconds used for the recovery time diminishes a retailer's business transactions.

Another important characteristic of an HA system is to achieve little or no loss of data during failover. In particular, it is important to achieve little or no loss of committed data. For example, it is not advantageous to lose valuable information about a customer order or customer information during failover.

To address the issues of recovery time and loss of data, many developers have developed customized HA software services to control applications in a custom environment which often requires new hardware. These solutions are often expensive and do not take advantage of open source technologies that allow for portability of applications across multiple platforms.

Alternatively, in an effort to further open source technology and portability across platforms, Java™ 2 platform, Enterprise Edition (J2EE) provides a reusable component model for use in building web applications. J2EE defines a standard application model, a standard platform for hosting applications, a compatibility requirement and an operation definition of the J2EE platform. An advantage of this open source model is that multiple developers can implement the J2EE model with additional components and configurations, yet all J2EE applications will run on a J2EE based system.

Many developers, such as International Business Machines, Corp. (IBM™), have developed software that implement the J2EE model. This software often fills in gaps not specified in the J2EE framework. IBM™, in particular, has developed a middleware stack of J2EE compliant software products that when implemented on a cluster of servers, support J2EE applications. In general, the middleware stack includes a web server, a database server, and a universal Internet application server. Specifically, this stack may include products such as the IBM DB2™ UDB Enterprise Edition, the IBM HTTP Server, and the IBMWebSphere™ Application Server.

In addition, in an effort to further the impact of open source technology and portability across platforms, Linux provides an inexpensive, platform independent operating system. Developers of Linux continue to add functions to the operating system that can be implemented in an open source manner by other developers. Some of these functions, such as "heartbeat" and distributed replicated block device (drbd), are implemented with the Linux operating system to assist in configuring HA systems.

In view of the foregoing, it would be advantageous to provide a method, system, and program for implementing an open source based HA system that delivers mission-critical services with a minimized recovery time and loss of data. In particular, it would be advantageous to implement a HA system supporting failover of a J2EE compliant middleware stack through an efficient configuration of open source functions, such that as additional components are added to the middleware stack, efficient failover of each component is supported.

SUMMARY OF THE INVENTION

The present invention provides improved high availability cluster management during failover. In particular, the present invention provides a method, system, and program for managing failover of J2EE compliant middleware in a HA system using open source cluster management tools configured to support the J2EE compliant middleware.

According to one aspect of the present invention, a HA cluster includes a primary node and a secondary node. Each node is running the same middleware stack for supporting web application. In particular, the middleware stack is J2EE complaint for supporting J2EE applications. According to one embodiment, the J2EE compliant middleware stack may include a load balancer, a web server, a web application server, a messaging server, a monitoring server, and a database control server. Further, according to one embodiment, the J2EE compliant middleware stack runs atop a Linux compliant operating system.

A heartbeat monitor runs on each of the nodes for directing the active and standby status of layers of the middleware. In addition, the heartbeat monitor detects failures in the nodes and controls failover from one node to the other.

Initially, in the primary node, the layers of the middleware stack are all active. A first virtual IP address is assigned to a load balancing of the primary node, where requests from clients for the services provided by the HA cluster are directed to the first virtual IP address. In the secondary node part of the layers of the redundant middleware stack are active and part are in standby. In particular, the standby layers include a message server and a database server.

A selection of the layers of the stack corresponding to standby layers in the secondary node are initially assigned a second virtual IP address. Persistent data resources accessible by this selection of layers in the primary node assigned to the second virtual IP address are activated in a data replication partition shared between the primary node and secondary node. In particular, this selection of layers includes a message server which launches a message queue and a database controller which launches a database on the data replication partition.

Each of the nodes is powered by a separate uninterruptible power supply (UPS). Each of the nodes is able to shutdown the power supply of the other node. For example, a serial cable may connect the UPS of the primary node and the secondary node and the UPS of the secondary node with the primary node.

When the heartbeat monitor detects a failure at the primary node, the heartbeat monitor transfers the services provided by the primary node to the secondary node with a short recovery time and minimal data loss. In particular, the heartbeat monitor transfers the first virtual IP address to the standby load balancer of the secondary node and activates the standby load balancer. In addition, the heartbeat monitor calls STONITH to direct the secondary node to turn off the UPS to the primary node. The heartbeat monitor also activates the standby layers of the secondary node, transfers the second virtual IP address to the activated standby layers and remounts the data replication partition for access by the secondary node.

In particular, before failover, but after the layers of the middleware stack in the primary node are activated, a redundant web application server layer is also activated in the secondary node. The redundant web application server is passed the second virtual IP address so that during failover, the redundant web application server will already point to the messaging server and database server accessible at the second virtual IP address after failover.

According to another aspect of the present invention, a cluster monitor running on each of the HA cluster nodes monitors both the hardware and the functions of the J2EE compliant middleware stack. If a service monitoring daemon detects that a service of the J2EE compliant middleware stack has failed, the service monitoring daemon will restart a new instance of the service with a new persistent identifier.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 10 is a block diagram depicting an enterprise network including multiple HA systems running J2EE middleware stacks in accordance with the method, system, and program of the present invention; and FIG. 11 is a high level logic flowchart depicting a process and program for controlling a monitoring controller within a HA cluster manager in accordance with the method, system, and program of the present invention; and FIG. 12 is a high level logic flowchart depicting a process and program for remotely controlling a cluster manager of an HA system to reconfigure the HA system.

DETAILED DESCRIPTION OF THE PREFERRED EMBODIMENT

Figure 1:
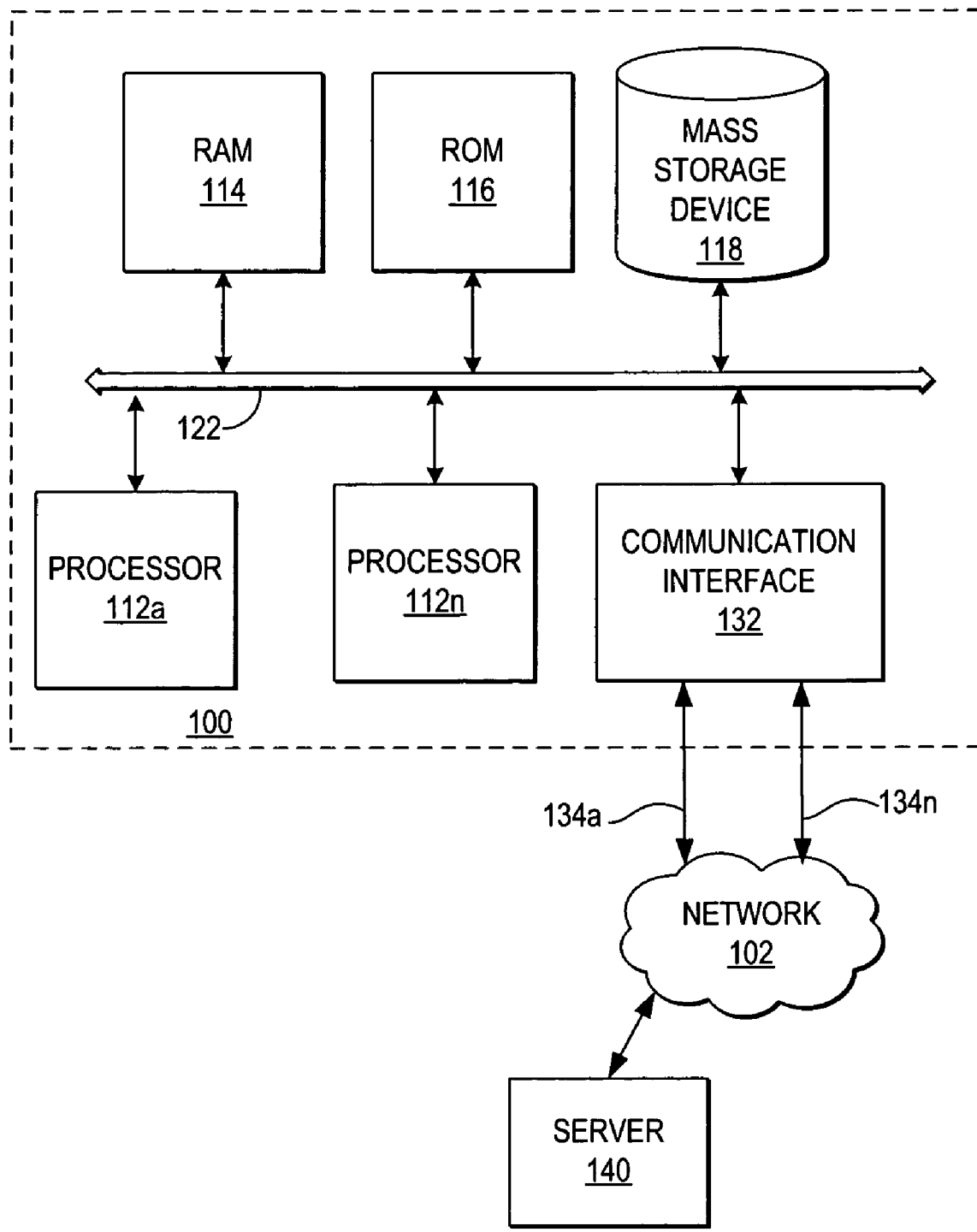
FIG. 1 is a block diagram depicting a server system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems, server systems, and enterprise systems.

Computer system 100 includes a bus 122 or other communication device for communicating information within computer system 100, and multiple processors 112a–112n coupled to bus 122 for processing information. Bus 122 preferably includes low-latency and higher latency paths that are connected by bridges and adapters and controlled within computer system 100 by multiple bus controllers.

Processor 112a–112n may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. In a preferred embodiment, multiple layers of software contains machine executable instructions that when executed on processors 112a–112n carry out the operations depicted in the flowcharts of FIGS. 7, 8, 9, 11, 12, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processors 112a–112n or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via one of network links 134a–134n to a communications interface 132 coupled to bus 122. Communications interface 132 provides a two-way data communications coupling to multiple network links 134a–134n that may be connected, for example, to a local area network (LAN), wide area network (WAN). When implemented as a server system, computer system 100 typically includes multiple communication interfaces accessible via multiple peripheral component interconnect (PCI) bus bridges connected to an input/output controller. In this manner, computer system 100 allows connections to multiple network computers.

In a network environment, computer system 100 communicates with other systems through network 102. Network 102 may refer to the worldwide collection of networks and gateways, that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network links 134a–134n and through communication interface 132, which carry the digital data to and from computer system 100, are exemplary forms of carrier waves transporting the information. Although not depicted, computer system 100 may also include multiple peripheral components that facilitate communication.

When computer system 100 is implemented as a server system in a HA cluster, additional network adapters may be included for supporting local connections with other server systems. In addition, when implemented as a server system in a HA cluster, computer system 100 may be designed as a commodity hardware server, such as the xSeries™ servers from IBM Corp.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
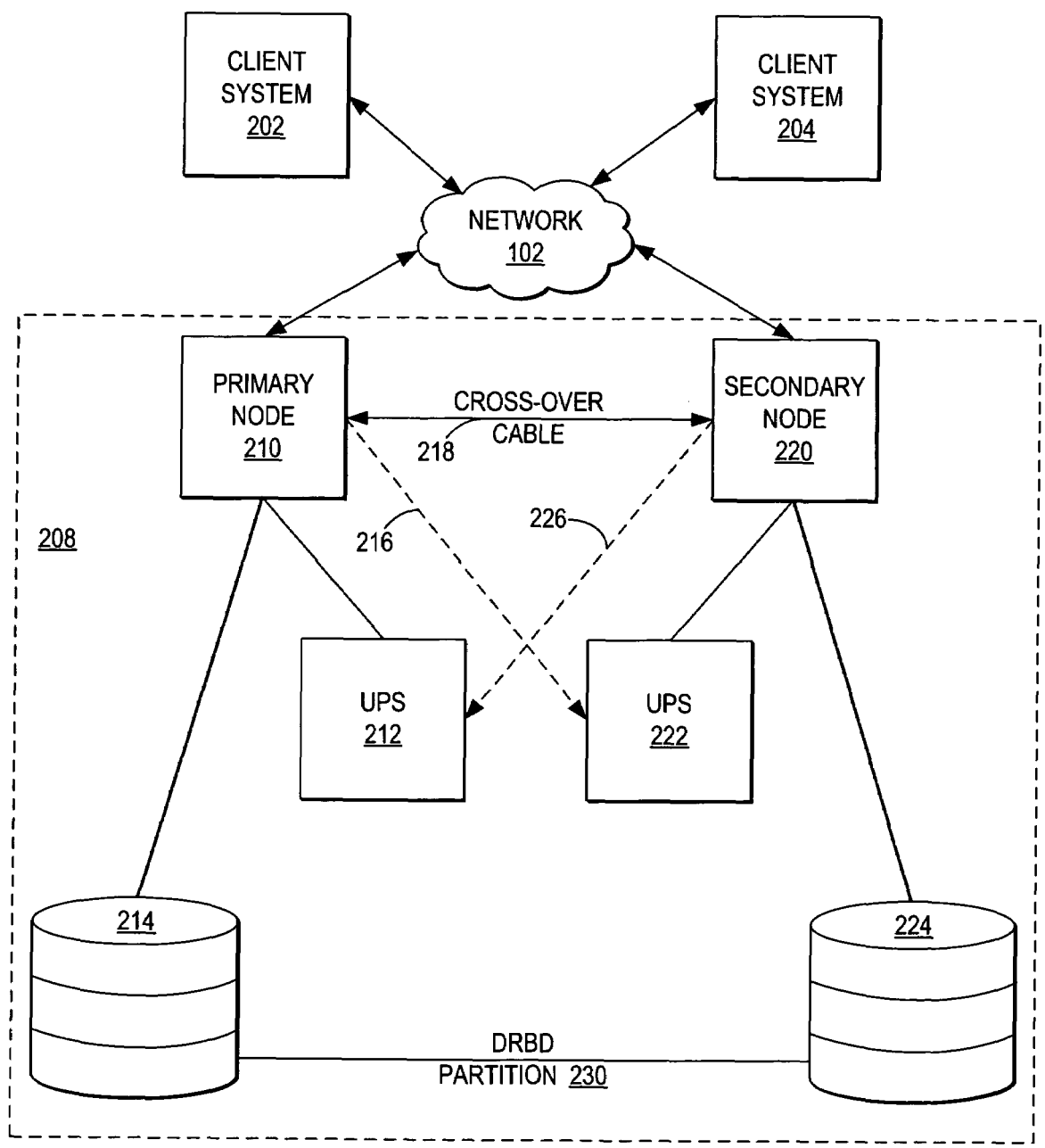
FIG. 2 is a block diagram depicting the hardware configuration of a high availability cluster for efficient transition of middleware during failover.

With reference now to FIG. 2, there is depicted a block diagram of the hardware configuration of a high availability cluster for efficient transition of middleware during failover. As illustrated, client systems 202 and 204 are connected to network 102 for transferring requests for services. In the embodiment, client systems 202 and 204 request services from a high availability (HA) system 208 configured for a quick recovery time with minimal committed data loss during failover.

As illustrated, HA system 208 includes a primary node 210 and a secondary node 220. As will be further described, primary node 210 and secondary node 220 preferably implement redundant hardware and software that when executed, provide a high availability system. In particular, primary node 210 and secondary node 220 implement redundant middleware which in a preferred embodiment supports J2EE applications. Middleware is the software that develops, integrates, and manages web applications and systems. As will be further described, the middleware enables integration of communication, processes, data and the automation of transaction capacity and systems management.

Primary node 210 and secondary node 220 are connected in a simple, reliable manner that enables each node to quickly check the heartbeat of the other node. In the embodiment, this connection is enabled by a cross-over cable 218 connected between network adapters at each node. In particular, cross-over cable 218 preferably enables an Ethernet connection for transferring heartbeat data. Alternatively, heartbeat data may also be transferred across the public IP connection via network 102 in event that cross-over cable 218 fails. It will be understood that other hardware may be implemented for providing the heartbeat communication channel between primary node 210 and secondary node 220 and that in addition to a network based connection, a serial connection may be implemented.

In particular, when a heartbeat signal is sent between primary node 210 and secondary node 220 over cross-over cable 218, if the heartbeat fails, then secondary node 220 will take over the services provided by primary node,210 before the failure. As will be further described, however, according to an advantage of the present invention, middleware components may further analyze the heartbeat failure and provide additional information about the failure before secondary node 220 takes over for the services provided by primary node 210. Further, as will be further described, both Linux based and non-Linux based heartbeats may be monitored via cross-over cable 218.

Primary node 210 and secondary node 220 access data storage systems 214 and 224. Advantageously, a data replicator, herein depicted as a drbd partition 230, includes a partition of each of data storage systems 214 and 224, for replicating data accessible by primary node 210 and secondary node 220 without requiring a storage device that is actually physically shared between primary node 210 and secondary node 220. According to an advantage of the present invention, drbd is configured to run on the partition to facilitate the transfer of data during failover from primary node 210 to secondary node 220. It will be understood that while the invention is described with respect to a drbd partition managed by drbd scripts, other distributed data replication systems may be implemented.

Uninterrupted power supply (UPS) 212 and UPS 222 each provide an independent power supply to primary node 210 and secondary node 220, respectively. Preferably, a connection is also established between UPS 212 and secondary node 220 and UPS 222 and primary node 210. In one embodiment, a serial cable 216 is provided from primary node 210 to UPS 222 and a serial cable 226 is provided from secondary node 220 to UPS 212. It will be understood, however, that other types of connection hardware may be implemented.

According to an advantage of the present invention, when a failure is detected in primary node 210, secondary node 220 begins receiving the requests previously directed to primary node 210 after failover. Because only a portion of the hardware, software, or network running on primary node 210 may fail, the only way to ensure that primary node 210 does not try to update data after the failover is to turn off UPS 212. Advantageously, as will be further described, when the failover to standby node 220 is detected, STONITH, described in more detail herein, is implemented by the cluster manager to direct a command from standby node 220 to UPS 212 to turn off the power supply.

Figure 3:
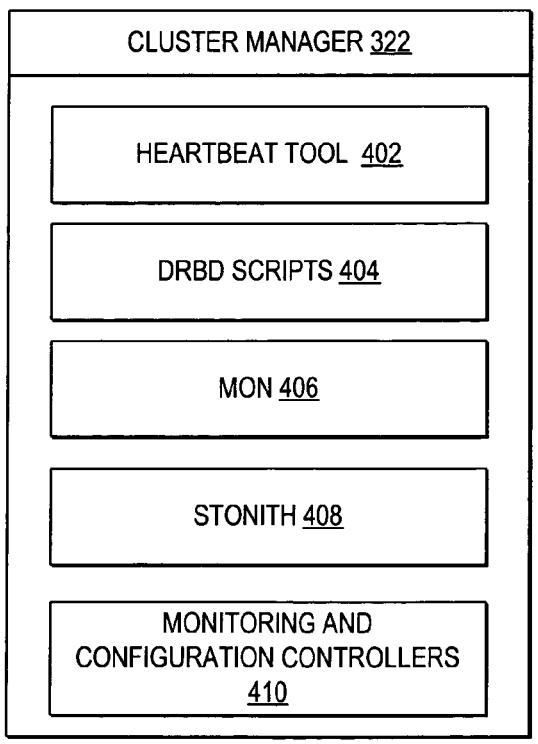
FIG. 3 is a block diagram depicting a cluster manager in accordance with the method, system, and program of the present invention.

With reference now to FIG. 3, there is depicted a block diagram of a cluster manager in accordance with the method, system, and program of the present invention. As illustrated, a cluster manager 322 includes multiple components utilized to implement an efficient failover including a heartbeat tool 402, drbd scripts 404, mon 406, and a stonith function 408. It will be understood that other components may be included in a cluster manager to manage other aspects of the cluster. Further, it will be understood that additional components may be included in cluster manager 322 to manage failover.

Heartbeat tool 402 preferably includes the heartbeat package for Linux, configured for managing failover within a HA cluster with a J2EE compliant middleware stack. In particular, Heartbeat tool 402 generally works by sending a "heartbeat" request between two nodes in a cluster. As described in FIG. 2, the heartbeat request may be sent through crossover cable between network adapters at each node. When applied to a J2EE compliant middleware stack running on clusters of server systems, heartbeat requests sent by heartbeat tool 402 are distributed about the different layers of the stack.

If the heartbeat request fails to be returned, then the secondary node can assume that the primary node failed and take over IP, data, and services that were running on the primary node. When the secondary node takes over the IP, data, and services that were running on the primary node, heartbeat tool 402 startups components of the secondary node that are waiting in standby mode, assigns IP addresses to components of the secondary node, and performs other failover tasks.

Drbd 404 is a kernel module with associated scripts that that manage data in a HA cluster for improved switching of data during failover. This is performed by mirroring a block device managed by drbd 404. Drbd is a script that loads the drbd module and configures with the IP addresses of the relevant systems in the HA cluster and the shared storage device.

When applied to a J2EE compliant middleware stack, the drbd managed block device provides storage on which the middleware stack can run. Initially, the cluster is configured and the drbd partition is mounted so that only the primary node can read or write from the drbd managed block device. When a failover occurs, the datadisk script of drbd 404 is run by heartbeat tool 402 to mount the drbd partition so that only the secondary node can read/write from the drbd managed block device.

Mon 406 is a service monitoring daemon that periodically runs monitoring scripts that monitor critical system services within the J2EE compliant middleware stack. If a service is found to have failed or terminated abnormally, mon 406 restarts the service to ensure that all components of the middleware stack remain running within the primary service. Abnormal termination may occur, for example, from programming errors or catastrophic operating system events such as temporary critical resource constraints with RAM. In particular, when mon restarts a service, it restarts a new instance of the service with a process identifier (PID) different from the dead service, but the same virtual IP address.

Stonith 406 is a function called by heartbeat tool 402 to ensure data integrity during failover. In particular, stonith 406 includes the configuration of the serial cables to UPS 212 and 222, as depicted in FIG. 2. When heartbeat tool 402 calls stonith 406, the call designates the node to be shutdown. Stonith sends a signal to turn off the power of the requested UPS.

Monitoring and configuration controller 410 includes multiple monitoring controllers which are specified for monitoring the status of hardware and software within the HA clusters. According to an advantage of the invention, status information about the multiple hardware and software components of HA clusters is forwarded to a remote centralized monitored console. Preferably, monitoring and configuration controller 410 supplements the Java™ Management Extensions (JMX) to monitor the hardware and software components of the HA clusters, to detect bottlenecks and potential problems, and to automatically recover the cluster from critical situations. In one embodiment, the monitoring controllers are enabled by Tivoli™ Monitoring which forwards monitored information to a Tivoli™ Enterprise Console (TEC).

According to one advantage of the invention, the remote centralized monitoring console can use the information gathered to determine configuration changes. In particular, according to an advantage of the invention, the monitoring controllers of monitoring and configuration controller 410 are each configured to monitor each hardware component in the HA cluster and each of the layers of the J2EE compliant middleware stack. Thus, based on monitored information about the hardware and middleware layers, the console can determine which middleware layers need more memory for caching requests, need more threads for handling requests, or need to be reconfigured in some other manner. The console can send configuration changes to the configuration controllers of monitoring and configuration controller 410, which then adjust the configuration of the HA clusters. In one embodiment, the configuration controller is a Tivoli™ Configuration Manager which manages the configuration characteristics of the HA clusters.

According to another advantage of the invention, in an enterprise system, the console use the information gathered to determine which HA clusters need hardware and software upgrades. For example, for the monitored information, the console can determine which stores have hardware which seems to be failing and needs to be replaced, which stores have hardware which has reached capacity and needs to be upgraded, and which stores have software that is failing or not running reliably.

According to yet another advantage of the invention, monitoring and configuration controller 410 interacts with the other monitoring components within cluster manager 322 to gather the status information that is sent to the console. For example, when mon 406 detects a failure of any of the monitored services, monitoring and configuration controller 410 sends a notification to the remote centralized monitoring console so that a bigger picture of failures in the system can be compiled. Further, when heartbeat tool 402 initiates a failover of one node of the system to another node, monitoring and configuration controller 410 sends a notification to the remote centralized monitoring console so that node failure statistics can be gathered.

Figure 4:
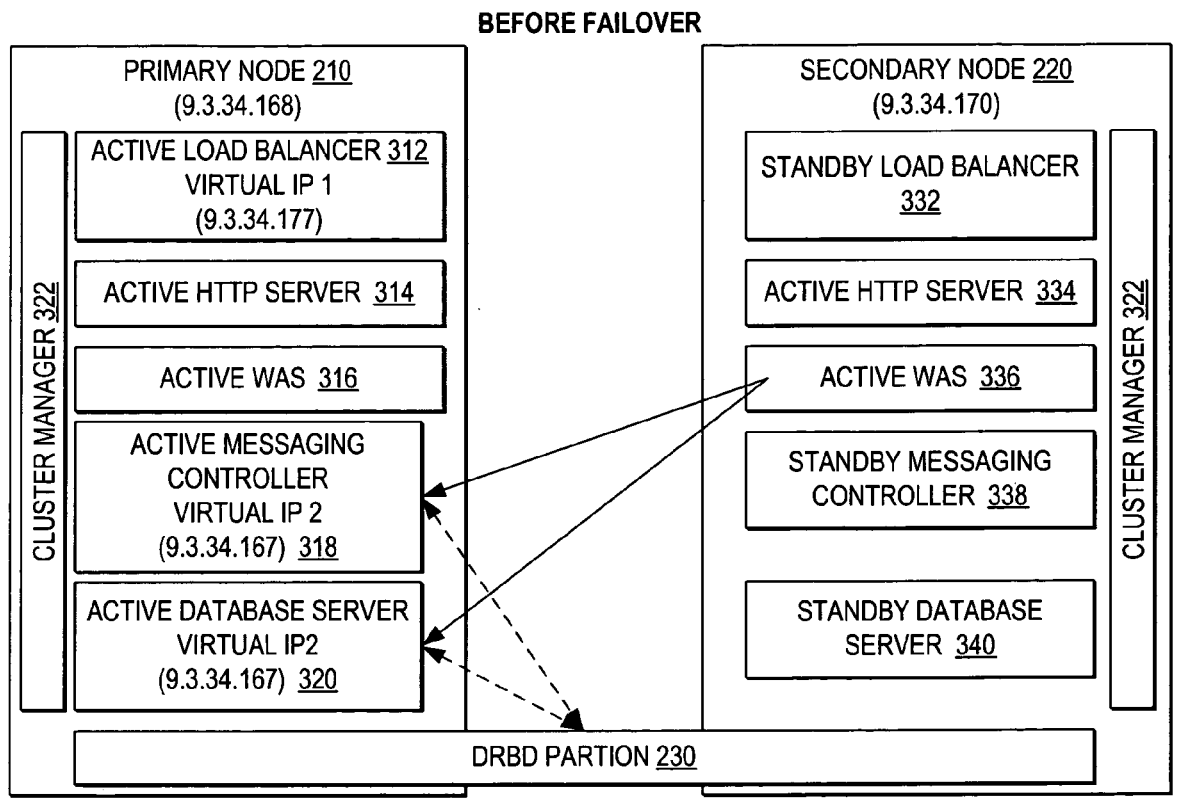
FIG. 4 is a block diagram depicting one embodiment of a software configuration of a HA cluster before failover in accordance with the method, system, and program of the present invention.

With reference now to FIG. 4, there is depicted a block diagram of one embodiment of a software configuration of a HA cluster before failover in accordance with the method, system, and program of the present invention. As depicted, primary node 210 and secondary node 220 represent clusters of server systems, each assigned to an IP address.

According to an advantage of the present invention, cluster manager 322 runs on primary node 210 and secondary node 220 to monitor for failures, restart services, and control failover when a failure is detected. As illustrated, cluster manager 322 sets up drbd partition 230 that is located on storage shared between primary node 210 and secondary node 220.

Primary node 210 includes all active components of the middleware stack: a load balancer 312, HTTP servers 314, web application servers (WAS) 316, messaging controllers 318, and a database server 320. Secondary node 220 includes active HTTP servers 334 and WASs 336, however, load balancer 332, messaging controllers 338, and database 340 are in standby mode.

Load balancers 312 and 332 preferably balance the load of requests between HTTP and WAS servers, which may also be clustered. Preferably, load balancers 312 and 314 perform intelligent load balancing by using server availability, capability, workload, and other criteria. According to one embodiment, load balancers 312 and 332 may be implemented through the IBM WebSpheret Edge Server.

As illustrated, load balancers 312 and 332 may implement a heartbeat independent of the Linux based heartbeat. Alternatively, the Linux based heartbeat monitoring 332 and 342 may monitor the status of load balancers 312 and 332.

HTTP servers 314 and 334 may include clusters of servers designed to receive HTTP requests and distribute HTTP requests among WAS 316 and 336, respectively. In addition, HTTP servers 314 and 334 are enabled to call enablers, such as servlet containers and Enterprise Java™ Bean (EJB) containers, when other requests, such as requests for servlets and EJBs, are received. According to one embodiment, HTTP servers 314 and 334 may be implemented through an HTTP server bundled with IBM's WebSphere™, and in particular WebSphere™ v. 5.0. WebSphere™ 5.0 is advantageous because multiple copies of the WebSphere™ components can be controlled from one location. Thus, configuration changes can be made in one place that affects multiple instances of the software components located on multiple server systems.

According to an advantage of the present invention, HTTP servers 314 and 334 are run in an active/active configuration where the heartbeat tool of cluster manager 322 actives HTTP server after primary node is up and running. By running HTTP servers 314 and 334 in an active/active configuration, the request load can be split across the two (or more) servers to increase the speed at which client requests are handled. In addition, by running HTTP servers 314 and 334 in an active/active configuration, then startup time on failover is reduced.

WAS 316 and 336 preferably include clusters of servers enabled to support web applications providing mission-critical services to customers, and in particular these servers are enabled to support J2EE applications. According to one embodiment, WAS 316 and 336 are WebSphere™ Application Servers supported by IBM's Websphere™ 5.0 that host the servlets, EJBs, and other J2EE components necessary for supporting a J2EE application and services.

WAS 316 interacts with messaging controller 318 and database server 320 to provide application server functionality integrated with messaging control and databases. According to an advantage of the present invention, WAS 316 and WAS 336 are run in an active/active configuration. In particular, when initializing the systems, once messaging controller 318 and database server 320 are available, the heartbeat tool of cluster manager 322 launches WAS 336 to create the active/active configuration. By running an active-active configuration, the request load can be split across multiple clusters of systems to increase the speed at which client requests are handled. In addition, by running an active/active configuration, then startup time on failover is reduced.

Messaging controllers 318 and 338 include a controller for listening for asynchronous requests and storing those requests in a local queue to provide a queue to communicate with J2EE based systems. Messaging controller 318 and 338 may implement IBM MQSeries™, IBM WebSphere™ MQ, or other message controllers that supplement the Java™ Messaging Service (JMS).

According to an advantage of the present invention, messaging controllers 318 and 338 are run in an active/standby configuration where the drbd of cluster manager 322 manages the persistent resources in the messaging queue in drbd partition 230 and the heartbeat tool of cluster manager 322 controls the startup of messaging controller 338 in a failover.

Database servers 320 and 340 provide control for persistent storage. Database servers 320 and 340 may be implemented through a database control system such as IBM DB2 UDB Enterprise Edition or other relational database management systems.

According to an advantage of the present invention, database servers 320 and 340 are run in an active/standby configuration where the drbd of cluster manager 322 manages the persistent resources in the database in drbd partition 230 and the heartbeat tool of cluster manager 322 controls the startup of database server 340 in a failover.

For messaging controllers 318 and 338 and database servers 320 and 340 to run in active/standby configuration and quickly failover with minimal data loss, messaging controller 318 and database server 320 are configured to point to the location where drbd partition 320 is mounted as the root for storage of the queue and database. In addition, cluster manager 322 configures drbd and the heartbeat tool with the virtual IP address of messaging controller 318 and database server 320.

Further, according to an advantage of the present invention, the mon function of cluster manager 322 periodically runs monitoring scripts that monitor critical system services, such as the services provided by-messaging controller 318 and database server 320. If a service is found to have failed or terminated abnormally, mon restarts the service to ensure that all components of the middleware stack remain running within the primary service.

It is important to note that the method of configuring each level of middleware to achieve efficient failover and controlling each level of middleware through cluster manager 322 may be applied to other types of middleware. Thus, as the functions available from a middleware software stack that is J2EE compatible continue to expand, each middleware component can be configured either in an active/active or active/standby configuration, monitored by cluster manager 322, and controlled during failover.

Figure 5:
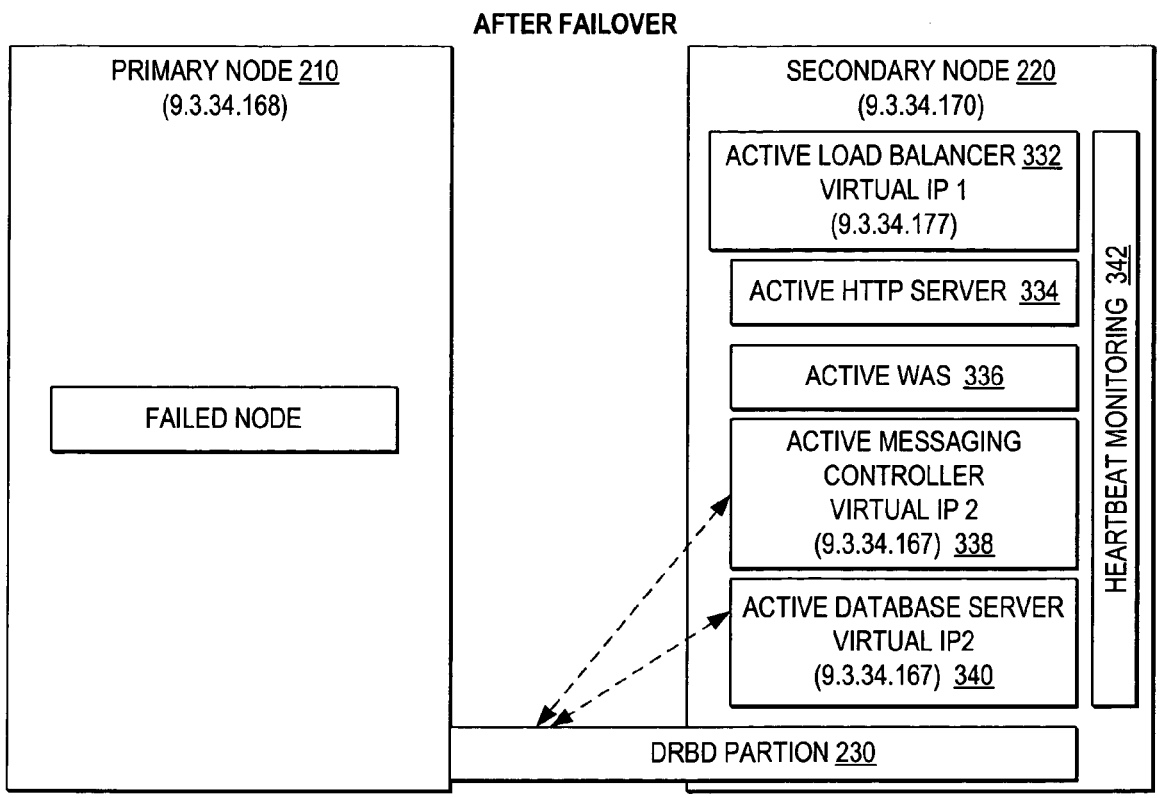
FIG. 5 is a block diagram depicting one embodiment of a software configuration of a HA cluster after failover in accordance with the method, system, and program of the present invention.

With reference now to FIG. 5, there is depicted a block diagram of one embodiment of a software configuration of a HA cluster after failover in accordance with the method, system, and program of the present invention. As depicted, after failover, primary node 210 is marked as a failed node. Secondary node 220 takes over as the all active node.

When a failure is detected and secondary node 220 designates primary node 210 as "dead", hardware and software issues are present. In particular, primary node 210 may not respond to a heartbeat request within the required time, however, would be operational shortly thereafter. To avoid a case where primary node 210 and secondary node 220 are both operational, as previously described, the heartbeat tool of cluster manager 322 will call STONITH to turn off the UPS to primary node 210. By implementing an inexpensive UPS, controllable by STONITH, data integrity can be achieved and the "split brain" issue of HA that can arise when the primary node is not really dead is avoided.

Next, during failover, the load balancer heartbeat manages startup of load balancer 332. When activated, the heartbeat tool of cluster manager 322 assigns the virtual IP1 address of primary node 210 to load balancer 332. Accordingly, requests to the virtual IP address are redirected to load balancer 332 so that no change in the IP address of the load balancing cluster occurs.

During failover, since HTTP server 334 and WAS 336 are already active, the heartbeat tool of cluster manager 322 does not need to startup these components. However, since messaging controller 338 and database server 340 are in standby, the heartbeat tool of cluster manager 322 needs to manage the failover of these layers. First, the heartbeat tool will takeover the virtual IP2 address. Next, the heartbeat tool will start the datadisk service of the drbd to configure and mount the drbd mirrored partition. Finally, the heartbeat tool will startup messaging controller 338 and database server 340 configured to virtual IP2 address and with the message queue and database instances launching on mirrored drbd partition 230. Alternatively, although not depicted, database server 340 may be in active mode, rather than standby, because the virtual IP2 address is only available to one node at a time. Since database server 340 does not attempt to touch the data on drbd partition 230 until a request arrives, at failover, database server 340 is configured to the virtual IP2 address and mirrored drbd partition 230 is accessible before a request arrives. In contrast, some layers, such as messaging controller 338 load data directly at startup and thus will crash if started up on secondary node 220 before failover because data on drbd partition 230 is not available to secondary node 220 before failover.

Figure 6:
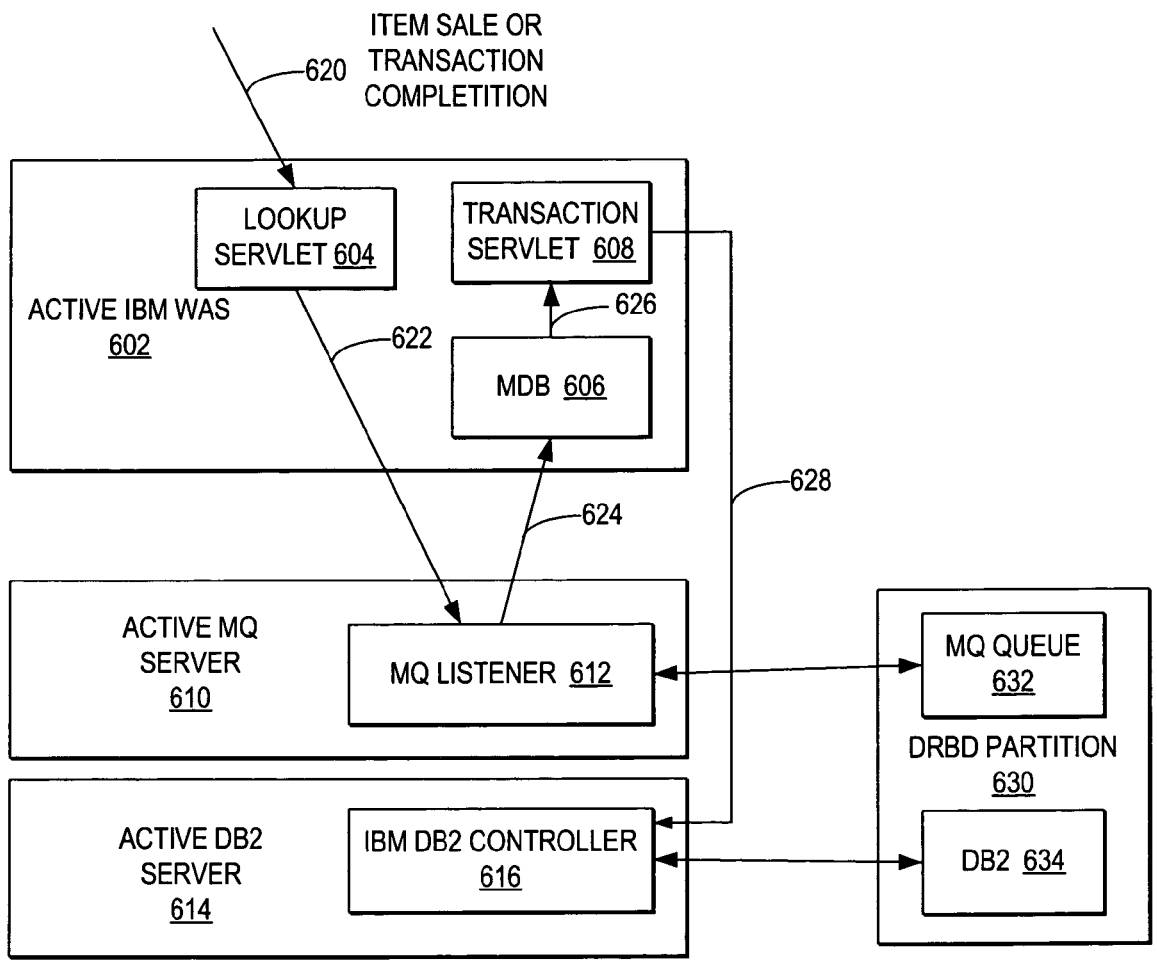
FIG. 6 is a block diagram depicting one embodiment of an implementation of an independent software vendor application within a J2EE compliant middleware in a HA system.

Referring now to FIG. 6, there is depicted a block diagram of one example of an implementation of an independent software vendor (ISV) application within a J2EE compliant middleware in a HA system. As illustrated, an active WAS 602, active IBM MQSeries™ server 610, and active IBM DB2 server 614 illustrate a portion of the primary node of a J2EE compliant middleware stack interfacing with a drbd partition 630. As illustrated at reference numeral 620, an item sale or transaction completion is received at an active WebSphere™ Application Server 602. An ISV may program a servlet or EJB to handle a particular type of incoming request. For example, as depicted at reference numeral 620, a lookup servlet 604 is an ISV web application that handles price lookups (PLU) to check the price of items as they are scanned at a cash register. Lookup servlet 602 then posts a request for the retain transaction to be completed asynchronously by another component, such as transaction servlet 608 or another servlet or EJB. First, however, as depicted at reference numeral 622, the information is transferred to MQ listener 612 and placed on MQ queue 632 to free lookup servlet 604 to receive the next incoming request and to ensure that the transaction will be recorded exactly once, in order, via MQ queue 632. Next, as depicted at reference numeral 624, MDB 606 is then called to take the transaction off MQ queue 632 and as depicted at reference numeral 626, to feed the transaction to transaction servlet 626. Transaction servlet 626 ultimately processes the PLU and, as depicted at reference numeral 628, commits the result to IBM DB2 controller 616 for storage in DB2 634.

In particular, FIG. 6 illustrates the advantages of the J2EE compliant middleware stack in a HA system during failover because the stack ensures that each transaction will be recorded exactly once, even if failover occurs after a request has already begun to transition between the layers of the stack. In addition, FIG. 6 illustrates the advantages of the J2EE compliant middleware stack in a HA system during failover because active layers MQSeries™ server 610 and DB2 server 614 interface with drbd partition 630 that is only accessible to the primary node, but is quickly remounted for access by the secondary node during failover.

Figure 7:
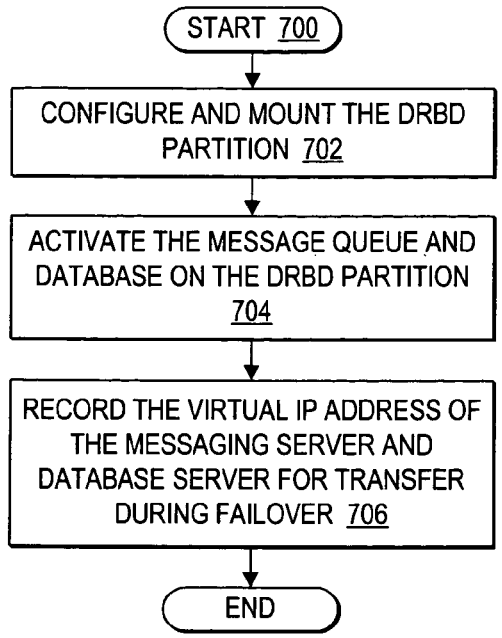
FIG. 7 is a high level logic flowchart depicting a process and program for configuring a drbd partition to a J2EE compliant middleware stack in a HA cluster.

With reference now to FIG. 7, there is depicted a high level logic flowchart of a process and program for configuring a drbd partition to a J2EE compliant middleware stack in a HA cluster. As depicted, the process starts at block 700 and thereafter proceeds to block 702. Block 702 depicts configuring and mounting the drbd partition. Next, block 704 depicts activating the message queue and database on the drbd partition. Thereafter, block 706 illustrates recording the virtual IP address of the messaging server and database server accessing the drbd partition for efficient transfer of access to the drbd partition during failover, and the process ends.

Figure 8:
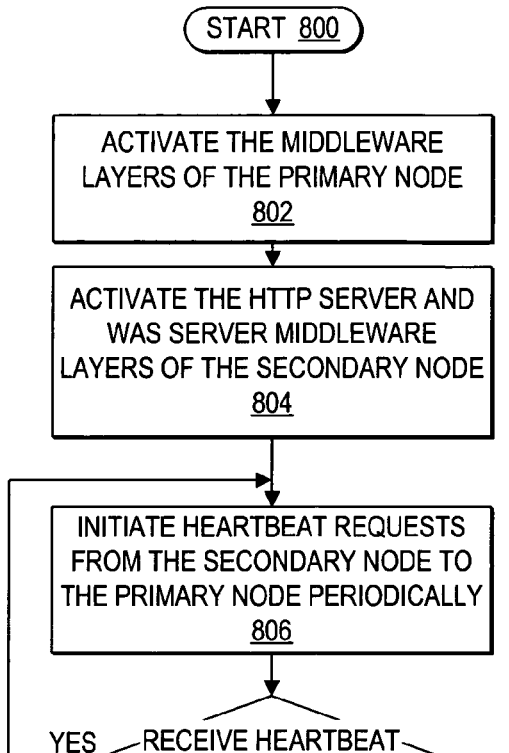
FIG. 8 is a high level logic flowchart depicting a process and program for controlling configuration and failover of a J2EE compliant middleware stack in a HA cluster through a heartbeat controller.

Referring now to FIG. 8, there is depicted a high level logic flowchart of a process and program for controlling configuration and failover of a J2EE compliant middleware stack in a HA cluster through a heartbeat controller. As depicted, the process starts at block 800 and thereafter proceeds to block 802. Block 802 illustrates activating the middleware layers of the primary node. Thereafter, block 804 depicts activating the HTTP server and the WAS middleware layers of the secondary node. In addition, other middleware layers that are designated to run in an active-active configuration are activated. Thereafter, block 806 depicts periodically initiating a heartbeat request from the secondary node to the primary node. Block 808 depicts a determination whether a heartbeat return is detected by the secondary node. If a heartbeat return is detected, then the process returns to block 806. If a heartbeat return is not detected, then the process passes to block 810.

Block 810 depicts calling STONITH to turn off the power supply of the primary node. Next, block 812 depicts taking over the virtual IP addresses from the primary node to assign to the redundant component in the secondary node. Thereafter, block 814 depicts calling the datadisk script to remount the drbd partition for access by the secondary node and the process ends. Then, block 816 depicts activating the standby middleware layers on the secondary node and launch data on the drbd partition. It will be understood that additional steps may be performed by the heartbeat tool and other cluster management services during failover.

Figure 9:
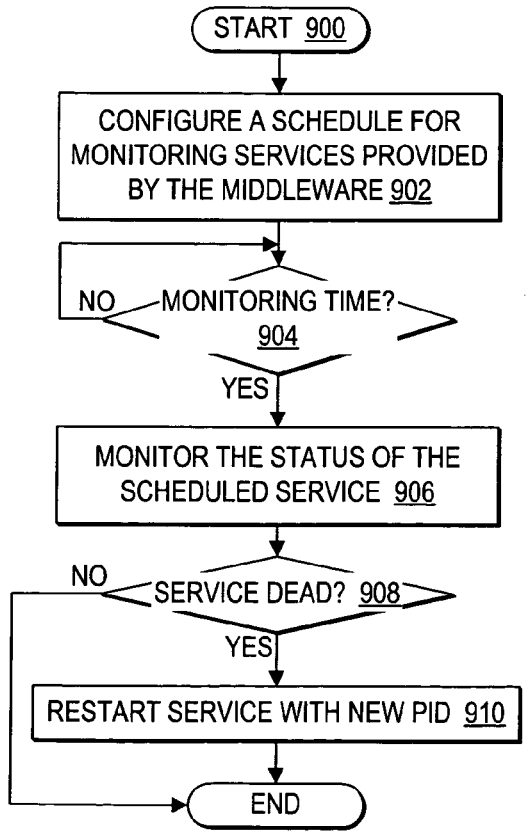
FIG. 9 is a high level logic flowchart depicting a process and program for controlling a mon function for monitoring services provided by a J2EE compliant middleware stack.

With reference now to FIG. 9, there is depicted a high level logic flowchart of a process and program for controlling a mon function for monitoring services provided by a J2EE compliant middleware stack. As depicted, the process starts at block 900 and thereafter proceeds to block 902. Block 902 depicts configuring a schedule for monitoring services provided by the middleware. Next, block 904 depicts a determination whether a scheduled monitoring time is triggered. If a scheduled monitoring time is not triggered, then the process iterates at block 904. If a scheduled monitoring time is triggered, then the process passes to block 906. Block 906 depicts-monitoring the status of the scheduled service. Thereafter, block 908 depicts a determination whether the service is detected as dead or failed in some manner. If the service is not detected as dead, then the process ends. If the service is detected as dead, then the process passes to block 910. Block 910 depicts restarting the same service with a new PID, and the process ends.

Referring now to FIG. 10, there is depicted a block diagram of an enterprise network including multiple HA systems running J2EE middleware stacks in accordance with the method, system, and program of the present invention. As depicted, a HA system 1202 and a HA system 1204 are communicative connected to a remote central console 1210 that monitors and remotely controls HA systems 1202 and 1204 via network 102. It will be understood that multiple HA systems may be monitored and controlled by a single or multiple remote central consoles.

According to an advantage of the invention, each of HA systems 1202 and 1204 may handle retail transactions and other mission critical operations. According to one embodiment, each of HA systems 1202 and 1204 enable high availability through redundant J2EE compliant middleware stacks that enable J2EE applications, such as the middleware stacks illustrated in FIGS. 4 and 5. In particular, each of HA systems 1202 and 1204 includes a cluster manager running monitoring and configuration controllers 410, as depicted in FIG. 3.

Advantageously, when errors, failures, or non-ideal conditions occur at any of HA systems 1202 and 1204, monitoring and configuration controllers 410 detect the condition of the system at the time of the error, failure or other non-ideal condition, analyze the condition and make a report to remote central console 1210. According to an advantage of the invention, if the heartbeat monitor or mon functions detect a failure or error, then monitoring and configuration controllers 410 are triggered.

Remote central console 1210 advantageously analyzes the error and failure information received from HA systems 1202 and 1204 and may return configuration changes to attempt to prevent and improve the efficiency of failovers. In addition, remote central console 1210 may compare the failures received from multiple HA systems to determine which systems need repairs and upgrades.

Referring now to FIG. 11, there is depicted a high level logic flowchart of a process and program for controlling a monitoring controller within a HA cluster manager in accordance with the method, system, and program of the present invention. As depicted, the process starts at block 1000 and thereafter proceeds to block 1002. Block 1002 depicts a determination whether a failure or error is detected from the heartbeat monitor, mon, or other monitoring controller monitoring a middleware stack in a HA system. If no failure or error is detected, then the process iterates at block 1002. If a failure or error is detected, then the process passes to block 1004. Block 1004 depicts gathering and analyzing available system information at the time of the failure or error. Next, block 1006 depicts sending the failure or error and available system information to a remote central console monitoring the HA system, and the process ends.

With reference now to FIG. 12, there is depicted a high level logic flowchart of a process and program for remotely controlling a cluster manager of an HA system to reconfigure the HA system. As illustrated, the process starts at block 1100 and thereafter proceeds to block 1102. Block 1102 depicts a determination of whether a configuration request is received from a remote central console to reconfigure the HA system running a middleware stack. If the request is not received, then the process iterates at block 1102. If the request is received, then the process passes to block 1104. Block 1104 depicts calling the heartbeat monitor to reconfigure the HA system failover settings, and the process ends. In addition, other controllers within the cluster manager of a HA system may be called to adjust other configurations.

While the invention has been particularly shown and described with reference to a preferred embodiment, it will be understood by those skilled in the art that various changes in form and detail may be made therein without departing from the spirit and scope of the invention.

What is claimed is:

1. A system for managing a high availability cluster during failover, comprising:
    a primary node running a middleware stack for supporting web applications, wherein a plurality of layers of said middleware stack are active, wherein said primary node is assigned a virtual IP address to which requests are directed;
    a secondary node running a redundant middleware stack mirroring said plurality of layers of said middleware stack of said primary node, wherein a first selection of said plurality of layers of said redundant middleware stack are active and a second selection of said plurality of layers of said redundant middleware stack are in standby;
    a data replication partition shared between said primary node and said secondary node with data accessible to a selection of said plurality of layers of said active middleware stack, wherein said selection of said plurality of layers of said active middleware stack correspond to said second selection of said plurality of layers of said redundant middleware stack in standby;
    a first power supply dedicated to said primary node;
    a second power supply dedicated to said secondary node;
    first connection means for connecting said first power supply and said secondary node;
    second connection means for connecting said second power supply and said primary node; and
    a heartbeat monitor for detecting a failure at said primary node, wherein in response to detecting said failure at said primary node, said heartbeat monitor transfers said virtual IP address from said primary node to said secondary node, said heartbeat monitor sends a shutoff command via said first connection means to turn off power to said first power supply, said heartbeat monitor remounts said data replication partition for access by said secondary node, said heartbeat monitor activates said second selection of said plurality of layers of said redundant middleware stack requiring access to said data within said data replication partition.

2. The system according to claim 1 for managing a high availability cluster, wherein said middleware stack and said redundant middleware stack support J2EE compliant web applications.

3. The system according to claim 1 for managing a high availability cluster, wherein said middleware stack and said redundant middleware stack comprise said plurality of layers comprising a selection from among a load balancer, a web server, a web application server, a messaging server, a monitoring server, and a database control server.

4. The system according to claim 1 for managing a high availability cluster, wherein said standby selection of said plurality of layers of said redundant middleware comprise at least one from among a messaging server and a database control server.

5. The system according to claim 1 for managing a high availability cluster, wherein a web application server active on said secondary node before failover points to a virtual IP address of a messaging server and a database control server from said middleware stack of said primary node.

6. The system according to claim 5 for managing a high availability cluster, wherein responsive to detecting said failure at said primary node, said heartbeat monitor takes over said virtual IP address and configures said second selection of said plurality of layers of said redundant middleware stack with said virtual IP address on startup.

7. The system according to claim 1 for managing a high availability cluster, wherein a message queue and a relational database are launched in said data replication partition.

8. The system according to claim 1 for managing a high availability cluster, wherein said data replication partition is a Data Replication Block Device.

9. The system according to claim 1 for managing a high availability cluster, further comprising:
a service monitoring daemon for monitoring a status of a plurality of services provided by said middleware stack, wherein responsive to detecting a failure of a particular service from among said plurality of services, said service monitoring daemon restarts another instance of said particular service at said primary node with a particular process identifier.

10. The system according to claim 1 for managing a high availability cluster, further comprising:
a cross-over cable connected between said primary node and said secondary node via network adapters; and
said heartbeat monitor for sending heartbeat requests via said cross-over cable, wherein in response to not receive a return of a heartbeat request, said heartbeat monitor detects a failure in the non-responsive node.

11. The system according to claim 1 for managing a high availability cluster, further comprising:
said middleware stack running in said primary node atop a Linux compliant operating system layer.

12. A system for managing middleware during failover in a high availability cluster, comprising:
a primary node comprising an active load balancing controller assigned to a first virtual IP address, an active HTTP server, an active web application server, an active management queue controller, and an active database controller each monitored by a first heartbeat;
a secondary node comprising a standby redundant load balancing controller, an active redundant HTTP server, an active redundant web application server, a standby redundant management queue controller, and a standby redundant database controller each monitored by a second heartbeat;
a drbd data storage partition shared between said primary node and said secondary node, wherein a message queue and a database implemented by said active management queue controller and said active database controller of said primary node are activated at said drbd data storage partition, and wherein said drbd allows access to said active management queue controller and said active database controller configured at a second virtual IP address; and
a heartbeat monitor for detecting a failure at said primary node, wherein in response to detecting said failure at said primary node, said heartbeat monitor transfers said first virtual IP address from said active load balancing controller to said redundant load balancing controller and activates said redundant load balancing controller, said heartbeat monitor calls STONITH to turn off power to said primary node, said heartbeat monitor activates and assigns said second virtual IP address to said redundant management queue controller and said redundant database controller, and said heartbeat monitor remounts said drbd partition for access by said redundant management queue controller and said redundant database controller.

13. A method for managing a high availability cluster during failover, comprising:
controlling a primary node running a middleware stack for supporting web applications, wherein a plurality of layers of said middleware stack are active, wherein said primary node is assigned a virtual IP address to which requests are directed;
controlling a secondary node running a redundant middleware stack mirroring said plurality of layers of said middleware stack of said primary node, wherein a first selection of said plurality of layers of said redundant middleware stack are active and a second selection of said plurality of layers of said redundant middleware stack are in standby;
managing a data replication partition shared between said primary node and said secondary node with data accessible to a selection of said plurality of layers of said active middleware stack, wherein said selection of said plurality of layers of said active middleware stack correspond to said second selection of said plurality of layers of said redundant middleware stack in standby;
establishing a first connection between a first power supply and said secondary node, wherein said first power supply is dedicated to said primary node;
establishing a second connection between said second power supply and said primary node, wherein said second power supply is dedicated to said secondary node; and
responsive to detecting a failure at said primary node, transferring said virtual IP address from said primary node to said secondary node, sending a shutoff command via said first connection to turn off power to said first power supply, remounting said data replication partition for access by said secondary node, activating said second selection of said plurality of layers of said redundant middleware stack which require access to said data within said data replication partition.

14. The method according to claim 13 for managing a high availability cluster, further comprising:

controlling said middleware stack and said redundant middleware stack to support J2EE compliant web applications.

15. The method according to claim 13 for managing a high availability cluster, wherein said middleware stack and said redundant middleware stack comprise said plurality of layers comprising a selection from among a load balancer, a web server, a web application server, a messaging server, a monitoring server, and a database control server.

16. The method according to claim 13 for managing a high availability cluster, wherein said standby selection of said plurality of layers of said redundant middleware comprise at least one from among a messaging server and a database control server.

17. The method according to claim 13 for managing a high availability cluster, further comprising:
enabling a web application server active on said secondary node before failover points to access a messaging server and a database control server from said middleware stack of said primary node.

18. The method according to claim 13 for managing a high availability cluster, further comprising:
launching a message queue and a relational database in said data replication partition.

19. The method according to claim 13 for managing a high availability cluster, further comprising:
monitoring a status of a plurality of services provided by said middleware stack;
responsive to detecting a failure of a particular service from among said plurality of services, restarting another instance of said particular service at said primary node with a particular persistent identifier.

20. The method according to claim 13 for managing a high availability cluster, further comprising:
sending heartbeat requests between said primary node and said secondary node; and
responsive to not receive a return of a heartbeat request, detecting a failure in the non-responsive node.

21. The method according to claim 13 for managing a high availability cluster, further comprising:
running said middleware stack in said primary node atop a Linux compliant operating system layer.

22. A computer program product, residing on a volatile or non-volatile computer readable medium, for managing a high availability cluster during failover, comprising:
means for controlling a primary node running a middleware stack for supporting web applications, wherein a plurality of layers of said middleware stack are active, wherein said primary node is assigned a virtual IP address to which requests are directed;
means for controlling a secondary node running a redundant middleware stack mirroring said plurality of layers of said middleware stack of said primary node, wherein a first selection of said plurality of layers of said redundant middleware stack are active and a second selection of said plurality of layers of said redundant middleware stack are in standby;
means for managing a data replication partition shared between said primary node and said secondary node with data accessible to a selection of said plurality of layers of said active middleware stack, wherein said selection of said plurality of layers of said active middleware stack correspond to said second selection of said plurality of layers of said redundant middleware stack in standby; and means for establishing a first connection between a first power supply and said secondary node, wherein said first power supply is dedicated to said primary node;
means for establishing a second connection between said second power supply and said primary node, wherein said second power supply is dedicated to said secondary node; and
means, responsive to detecting a failure at said primary node for transferring said virtual IP address from said primary node to said secondary node, for sending a shutoff command via said first connection to turn off power to said first power supply, remounting said data replication partition for access by said secondary node, activating said second selection of said plurality of layers of said redundant middleware stack which require access to said data in said data replication partition.

23. The computer program product according to claim 22 for managing a high availability cluster, furthering comprising:
means for controlling said middleware stack and said redundant middleware stack to support J2EE compliant web applications.

24. The computer program product according to claim 22 for managing a high availability cluster,
means for controlling said middleware stack and said redundant middleware stack comprising a selection from among a load balancer, a web server, a web application server, a messaging server, a monitoring server, and a database control server.

25. The computer program product according to claim 22 for managing a high availability cluster, further comprising:
means for enabling a web application server active on said secondary node before failover points to access a messaging server and a database control server from said middleware stack of said primary node.

26. The computer program product according to claim 22 for managing a high availability cluster, further comprising:
means for launching a message queue and a relational database in said data replication partition.

27. The computer program product according to claim 22 for managing a high availability cluster, further comprising:
means for monitoring a status of a plurality of services provided by said middleware stack;
means, responsive to detecting a failure of a particular service from among said plurality of services, for restarting another instance of said particular service at said primary node with a particular persistent identifier.

28. The computer program product according to claim 22 for managing a high availability cluster, further comprising:
means for sending heartbeat requests between said primary node and said secondary node; and
means, responsive to not receive a return of a heartbeat request, for detecting a failure in the non-responsive node.

29. The computer program product according to claim 22 for managing a high availability cluster, further comprising:
means for running said middleware stack in said primary node atop a Linux compliant operating system layer.

30. A method for managing middleware during failover in a high availability cluster, comprising:
controlling a primary node comprising an active load balancing controller assigned to a first virtual IP address, an active HTTP server, an active web application server, an active management queue controller, and an active database controller each monitored by a first heartbeat;

controlling a secondary node comprising a standby redundant load balancing controller, an active redundant HTTP server, an active redundant web application server, a standby redundant management queue controller, and a standby redundant database controller each monitored by a second heartbeat;

managing a drbd data storage partition shared between said primary node and said secondary node, wherein a message queue and a database implemented by said active management queue controller and said active database controller of said primary node are activated at said drbd data storage partition, and wherein said drbd allows access to said active management queue controller and said active database controller configured at a second virtual IP address; and responsive to a heartbeat monitor detecting said failure at said primary node, transferring said first virtual IP address from said active load balancing controller to said redundant load balancing controller and activates said redundant load balancing controller, calling STONITH to turn off power to said primary node, activating and assigning said second virtual IP address to said redundant management queue controller and said redundant database controller, and remounting said drbd partition for access by said redundant management queue controller and said redundant database controller.

31. A computer program product, residing on a volatile or non-volatile computer readable medium, for managing middleware during failover in a high availability cluster, comprising:

means for controlling a primary node comprising an active load balancing controller assigned to a first virtual IP address, an active HTTP server, an active web application server, an active management queue controller, and an active database controller each monitored by a first heartbeat;

means for controlling a secondary node comprising a standby redundant load balancing controller, an active redundant HTTP server, an active redundant web application server, a standby redundant management queue controller, and a standby redundant database controller each monitored by a second heartbeat;

means for managing a drbd data storage partition shared between said primary node and said secondary node, wherein a message queue and a database implemented by said active management queue controller and said active database controller of said primary node are activated at said drbd data storage partition, and wherein said drbd allows access to said active management queue controller and said active database controller configured at a second virtual IP address; and means, responsive to a heartbeat monitor detecting said failure at said primary node, for transferring said first virtual IP address from said active load balancing controller to said redundant load balancing controller and activates said redundant load balancing controller, calling STONITH to turn off power to said primary node, activating and assigning said second virtual IP address to said redundant management queue controller and said redundant database controller, and remounting said drbd partition for access by said redundant management queue controller and said redundant database controller.

* * * * *